Sept. 27, 1955 | O. C. DARACK | 2,719,219
RADIO RECEIVER SYSTEM
Filed Jan. 27, 1950
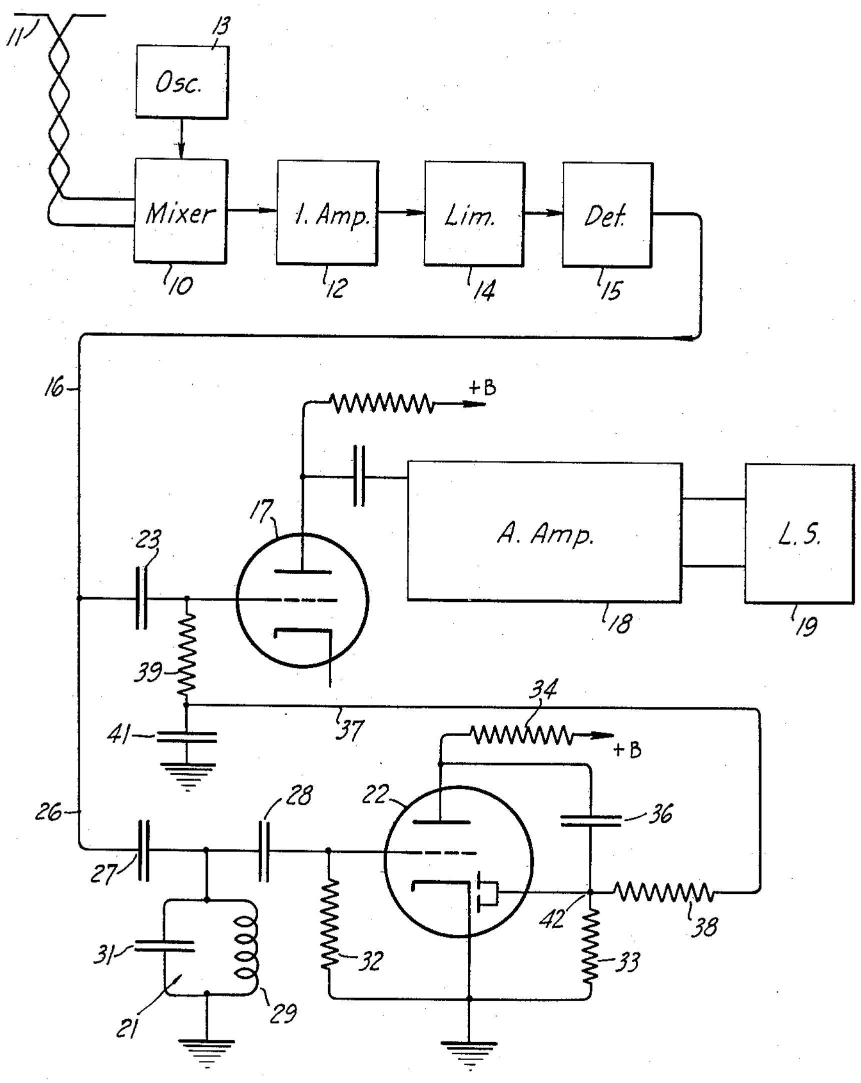
INVENTOR.
Oscar C. Darack
BY Fisher & Swain
ATTORNEYS United States Patent Office 2,719,219

Patented Sept. 27, 1955

2,719,219

RADIO RECEIVER SYSTEM

Oscar C. Darack, Sausalito, Calif., assignor to Sundial Broadcasting Corporation, Sausalito, Calif., a corporation of Delaware Application January 27, 1950, Serial No. 140,793

1 Claim. (Cl. 250—20)

This invention relates generally to radio receiver systems such as are suitable for reception of broadcast programs. It is particularly applicable to radio receivers of the frequency modulation (i. e. FM) type.

In the operation of radio broadcast receivers the intervention of advertising matter or "commercials" between entertainment programs interferes with use of the programs for many purposes, as for example to furnish background music in industrial plants. It is impractical to monitor the receiver in such a manner as to eliminate the commercial or advertising matter. Time controlled cut-out switches cannot be relied upon because the commercials are not always on a set time schedule, and they are not confined to predetermined periods of time. In addition it is difficult to maintain a number of receivers in exact time synchronism.

It is a general object of the present invention to provide a practical system for eliminating reproduction of commercials for a selected group of radio broadcast receivers, and which will not require any monitoring or time controlled devices at the receiving station.

It is another object of the invention to provide a system of the above character which is controlled by means of a special signal of predetermined frequency, which is transmitted while commercials are being broadcast, and which serves to automatically block or suppress reproduction of commercials at the receiving station.

An additional object of the invention is to provide a simplified electrical circuit for the purposes outlined above, which will be reliable for subscriber purposes, relatively free of servicing requirements, and simple with respect to the vacuum tubes required.

An additional object of the invention is to provide a circuit of the above character having means for affording delayed restoration of the receiver after transmission of the control frequency is interrupted, whereby the receiver is restored to normal operation a predetermined time interval after discontinuance of the signal, and without clicks or other undesirable noises.

Additional objects of the invention will appear from the following description in which the preferred embodiment has been set forth in detail in conjunction with the accompanying drawing.

The drawing illustrates a circuit incorporating the invention and applied in conjunction with a frequency modulation (FM) broadcast receiver. As representative of such a receiver, I have shown a mixer or converter 10 connected to the antenna 11, and having its output applied to the intermediate frequency amplifier 12. The local oscillator 13 is coupled to the mixer 10 and operates at a predetermined frequency. The output of the intermediate amplifier 12 is passed through the limiter 14 and applied to the frequency modulation detector 15. This detector may be any one of a number of well known types, as for example a frequency discriminator, or a detector of the ratio type. Conductor 16 represents the output lead from the discriminator 15, and is applied to the input of a suitable audio frequency amplifier. As illustrated the first stage of this amplifier comprises the vacuum tube 17, and the subsequent stage or stages are represented diagrammatically at 18. The final amplified output is supplied to the sound translator or loud speaker 19.

In addition to the parts described above, I provide special means responsive to receipt of a signal frequency to change the relative voltages applied to the grid and cathode of tube 17 and thereby suppress or block amplification of voice frequencies. As will be presently explained the signal frequency is preferably supersonic, as for example a frequency of the order of 18.5 kilocycles.

The relatively simple means employed and which is responsive to such a signal frequency, consists of a selective circuit 21, together with an amplifying vacuum tube 22, and elements serving to couple the same to the output of the discriminator 15 and the input or grid circuit of the audio frequency amplifier tube 17. Thus coupling condenser 23 connects between the detector output lead 16 and the grid of the audio amplifier tube 17. A conductor 26 connects from lead 16 and is coupled to the grid of the tube 22, through the series condensers 27 and 28.

The circuit 21 consists of the inductance 29 and shunt capacitance 31, and has its one side connected between the condensers 27 and 28, and its other side grounded. This LC circuit is adjusted to be resonant to the signal frequency and forms a selective bandpass filter.

The cathode of the amplifying tube 22 is directly grounded as illustrated, and the grid of this tube is grounded through the biasing resistor 32.

The tube 22 is preferably a combination triode-diode having a relatively high amplification factor in the triode section. For example I can use tubes such as known by manufacturer's specifications as Nos. 6SQ7 or 6AQ6. The diode plates of the tube 22 are shown connected together and to ground through the resistor 33. The triode plate is connected to the positive side of the battery potential through resistor 34. A condenser 36 connects between the triode and diode plates.

In order to couple the output of tube 22 to the grid circuit of the amplifying tube 17, a conductor 37 has its one end connected to the diode plates through the resistor 38. The grid of the amplifying tube 17 is connected to ground through the resistor 39 and series condenser 41. The conductor 37 is connected between the elements 39 and 41 as illustrated.

By way of example, rather than limitation, the various electrical elements described above can have values as follows: Condenser 23, 0.01 mfd., condenser 27, 500 mmf., condenser 28, 250 mmf., condenser 31, 0.01 mfd., inductance 29, 7.5 mh., resistor 32, 10 meg., resistor 33, 10 meg., resistor 34, 470,000 ohms, condenser 36, 250 mmf., resistor 38, 1 meg., resistor 39, 4.7 meg., condenser 41, 0.02 mfd.

Operation of my circuit is as follows: The transmitting station is supplied with a suitable source of signal frequency such as an 18.5 kilocycle oscillator. By means known to those skilled in the art this oscillator is arranged so that it can be applied to modulate the FM transmitter. Modulation of the transmitter by approximately 40% with the signal frequency, will give good results. Preferably the wave form of the signal frequency is sinusoidal.

When a musical program is being transmitted the signal frequency is not applied and the receiver operates according to normal conventional practice, without being affected by the presence of the selecting circuit 21 and the amplifying tube 22. At the end of a musical program, and immediately before a commercial statement is to be made, the operator at the transmitting station applies the 18.5 kilocycle modulating signal, whereby this frequency appears in the output of the discriminator 15.

Since the circuit 21 is tuned to be in resonance with the signal frequency, it presents a relatively high impedance. Also the condenser 27 presents a relatively low impedance to the signal frequency. The signal frequency therefore applies substantial voltage pulses to the grid of the tube 22, and since tube 22 acts as an amplifier, a substantial rectified plate to cathode current flows through the diode section of the tube. The point 42 accordingly becomes strongly negative relative to ground, and because this point is coupled to the grid of tube 17 through the resistors 38 and 39, the grid of tube 17 is driven negative relative to the cathode, to thereby block this tube against amplification of voice frequencies. At the same time the rectified voltage is applied to the grid of tube 17 the condenser 41 is charged, and remains charged during the period that the signal frequency is applied.

At the end of the commercial the operator at the transmitting station interrupts further application of the signal frequency, and after a short interval the musical program is continued. When application of the signal frequency is interrupted at the transmitting station, tube 22 is immediately restored to normal condition, but a substantial time period elapses before amplifying tube 17 is restored for normal amplification of voice frequencies. This time delay corresponds generally to the time interval required for discharge of the condenser 41. Thus while this condenser is discharging it tends to maintain the blocking of tube 17 for a substantial interval such as about one-half second, and likewise the restoration of tube 17 is made gradual to avoid clicks or loud noises.

It will be evident from the above that my invention can be applied for the purpose of silencing or eliminating reproduction of commercials in a selected group of subscriber receivers. At the same time other receivers will translate the programs together with all of the commercial statements. In this connection it will be noted that a conventional FM receiver will not be affected by the signal frequency. Although this signal frequency will appear in the output of the discriminator or other FM detector, it will not be heard in the loud speaker output because it is supersonic.

It will be evident that the invention described above is capable of various modifications and embodiments as will be understood by those skilled in the art.

I claim:

In a radio receiving system, electrical means for detecting frequency modulated radio signal energy, a multistage audio frequency amplifying means coupled to the output of the detector and including a first stage vacuum tube audio amplifier having plate, control grid and cathode elements, means coupled to the output of the amplifying means for translating sound frequencies into audible frequencies, a frequency selecting circuit coupled to the output of the detector and selective to a supersonic signal frequency, said frequency selecting circuit comprising a pair of condensers connected in series to the output of the detector and a parallel resonant circuit connected between said condensers to ground, said parallel resonant circuit being resonant at said supersonic frequency, an additional amplifying means including a vacuum tube having plate, control grid and cathode elements, means serving to couple the control grid of said last named tube to the last of said serially connected condensers whereby voltages of said selected supersonic signal frequency are applied to the control grid of said last named tube, rectifying means having plate and cathode elements, condenser means connecting the plate element of said rectifying means to the plate of said last named tube whereby said rectifying means provides rectified negative voltage responsive to the application of voltages from said supersonic signal frequency to the control grid of said last named tube, a first resistor and a time delay condenser connected in series between the control grid of the first named tube and ground, means including a second resistor connected to the plate element of said rectifying means for applying said rectified voltage to a point intermediate said first resistor and time delay condenser whereby when a supersonic signal frequency is received, said first named tube will be biased beyond cut-off, and a third resistor connected between ground and a point between said second resistor and said plate elements of said rectifying means, said time delay condenser and said third resistor being of such values that they continue suppression of said first named tube for a predetermined period of time after discontinuance of reception of said supersonic signal frequency.

References Cited in the file of this patent

UNITED STATES PATENTS

| | | |
|---|---|---|
| 1,941,067 | Armstrong | Dec. 26, 1933 |
| 2,010,253 | Barton | Aug. 6, 1935 |
| 2,165,596 | White | July 11, 1939 |
| 2,250,596 | Mountjoy | July 29, 1941 |
| 2,261,643 | Brown | Nov. 4, 1941 |
| 2,264,019 | Case | Nov. 25, 1941 |
| 2,280,420 | Chappell | Apr. 21, 1942 |
| 2,292,063 | Dome | Aug. 4, 1942 |
| 2,392,672 | Koch | Jan. 8, 1946 |
| 2,437,876 | Cohn | Mar. 16, 1948 |
| 2,501,416 | Smith | Mar. 21, 1950 |
| 2,602,885 | Armstrong | July 8, 1952 |